United States Patent [19]

Tinch et al.

[11] 4,312,040
[45] Jan. 19, 1982

[54] WELL LOG DEPTH ALIGNING

[75] Inventors: David H. Tinch, New Orleans, La.; Bruce N. Carpenter, Ridgefield; Elie S. Eliahou, Danbury, both of Conn.

[73] Assignee: Schlumberger Limited, New York, N.Y.

[21] Appl. No.: 66,541

[22] Filed: Aug. 15, 1979

Related U.S. Application Data

[63] Continuation of Ser. No. 70,709, Sep. 9, 1970, abandoned.

[51] Int. Cl.³ .......................... G01V 9/00; G06F 15/20
[52] U.S. Cl. ..................................... 364/422; 73/151; 324/323
[58] Field of Search ............... 364/421, 422, 604, 728; 73/151; 367/40, 43; 356/71; 324/323

[56] References Cited

U.S. PATENT DOCUMENTS

| | | | |
|---|---|---|---|
| 3,275,980 | 9/1966 | Foster | 364/422 X |
| 3,371,198 | 2/1968 | Greening | 364/421 |
| 3,404,261 | 10/1968 | Jespers et al. | 364/604 |
| 3,449,553 | 6/1969 | Swan | 364/604 |
| 3,457,499 | 7/1969 | Tanguy | 324/323 |
| 3,457,544 | 7/1969 | Miller et al. | 346/33 WL |
| 3,496,371 | 2/1970 | Endo | 356/71 |
| 3,512,127 | 5/1970 | Burg | 367/43 |
| 3,514,585 | 5/1970 | Norsworthy | 364/604 |
| 3,530,430 | 9/1970 | Embree | 367/40 |
| 3,541,314 | 11/1970 | Webb | 364/728 |
| 3,553,722 | 1/1971 | Ott | 367/40 |

FOREIGN PATENT DOCUMENTS

| | | | |
|---|---|---|---|
| 610571 | 12/1960 | Canada | 364/819 |
| 1473006 | 2/1967 | France | 364/819 |

Primary Examiner—Felix D. Gruber
Attorney, Agent, or Firm—Cooper, Dunham, Clark, Griffin & Moran

[57] ABSTRACT

In accordance with an illustrative embodiment of the invention, a technique is set forth for determining the depth match between two or more well logs derived from separate passes through a borehole. More particularly, first assumption depth displacement values are determined for a number of depth levels through use of a suitable correlation function. The first assumption depth displacement values for a selected number of depth levels are then analyzed to determine more accurate depth displacement values, which ultimately are used to depth-align the logs.

23 Claims, 7 Drawing Figures

| DEPTH LEVEL | $SH_S$ | $SH(Z)$ | $SH_D$ |
|---|---|---|---|
| $Z_1$ | 0 | 0 | 1/0 |
| $Z_2$ | 0 | 0 | 0 |
| $Z_3$ | 1 | 1 | 0 |
| $Z_4$ | 2 | 2 | 0 |
| $Z_5$ | 1 | 1 | 0 |
| $Z_6$ | 3 | 3 | 0 |
| $Z_7$ | 1 | 1 | 0 |
| $Z_8$ | 0 | 0 | 0 |
| $Z_9$ | 1 | 1 | 0/1 |
| $Z_{10}$ | 1 | 1 | 1 |
| $Z_{11}$ | 1 | 1 | 1 |
| $Z_{12}$ | 0 | 0 | 0 |

WELL LOG DEPTH ALIGNING

This is a continuation of application Ser. No. 70,709 filed Sept. 9, 1970, now abandoned.

This invention relates to methods for correlating the relative depth levels of well logging data derived from separate passes through a borehole. In particular, the invention relates to data processing techniques for accomplishing such depth correlation.

In the logging of an earth borehole, measurements of various formation characteristics are taken at different depth levels throughout the borehole by means of a measuring device which is lowered into the borehole on the end of a supporting cable extending from the surface of the earth. Typically, the measurements taken along the length of the borehole are intended to provide indications of oil or gas bearing strata. It is more and more the practice to combine measurements taken during different runs through a borehole with different investigating devices to produce computed measurements of various characteristics or parameters of the earth formations. When combining measurements made during two separate runs through the borehole, it is important that the separately derived measurements be accurately correlated in depth with one another.

In the past, sheave-wheel devices located at the surface of the earth have provided measurements of the length of cable which passes over the sheave wheel. Unfortunately, such a cable length measuring device does not accurately take cable stretch into account. One cable length measuring system which accounts for cable stretch is shown in U.S. Pat. No. 3,497,958 granted to L. H. Gollwitzer on Mar. 3, 1970. This Gollwitzer system measures the tension in the cable at the surface of the earth and at the tool and corrects the cable length measurements derived from the sheave wheel device for changes in stretch of the cable as reflected by the tension measurements. The Gollwitzer system also corrects for sheave wheel calibration errors and temperature effects on cable stretch.

While the Gollwitzer system has been found to provide extremely accurate depth measurements, there are factors which can cause even the elaborate Gollwitzer system to produce slight errors. For the usual situation, these errors are insignificant and can be ignored. However, when considering the more recent sophisticated and high-powered computational techniques, it becomes desirable to obtain highly accurate depth alignment between data derived from separate runs or passes through the borehole before combining such data for computational purposes.

It is therefore the object of the present invention to provide new and improved methods of determining automatically the depth match between samples of well logging data derived from separate depth levels in a borehole.

In accordance with the present invention, a method of automatically determining the displacements between a plurality of well logs derived from investigating devices passed through a borehole and sampled at separate depth levels comprises producing first and second data corresponding to samples derived from separate depth levels in a borehole and determining the depth displacement between a selected sample of the first data and a corresponding sample of the second data which is assumed, as a first assumption, to be derived from the same depth level as the selected sample of first data.

The method further comprises repetitively performing the step of determining the depth displacement between a number of successive samples of the first data and corresponding samples of second data and comparing the depth displacements determined from a number of successive samples for selecting one of such depth displacements as a more accurate depth displacement representation.

For a better understanding of the present invention, together with other and further objects thereof, reference is had to the following description taken in connection with the accompanying drawings, the scope of the invention being pointed out in the appended claims.

Referring to the drawings:

FIG. 5 is a table illustrating how depth shifts may be declared; and

Figure 1:
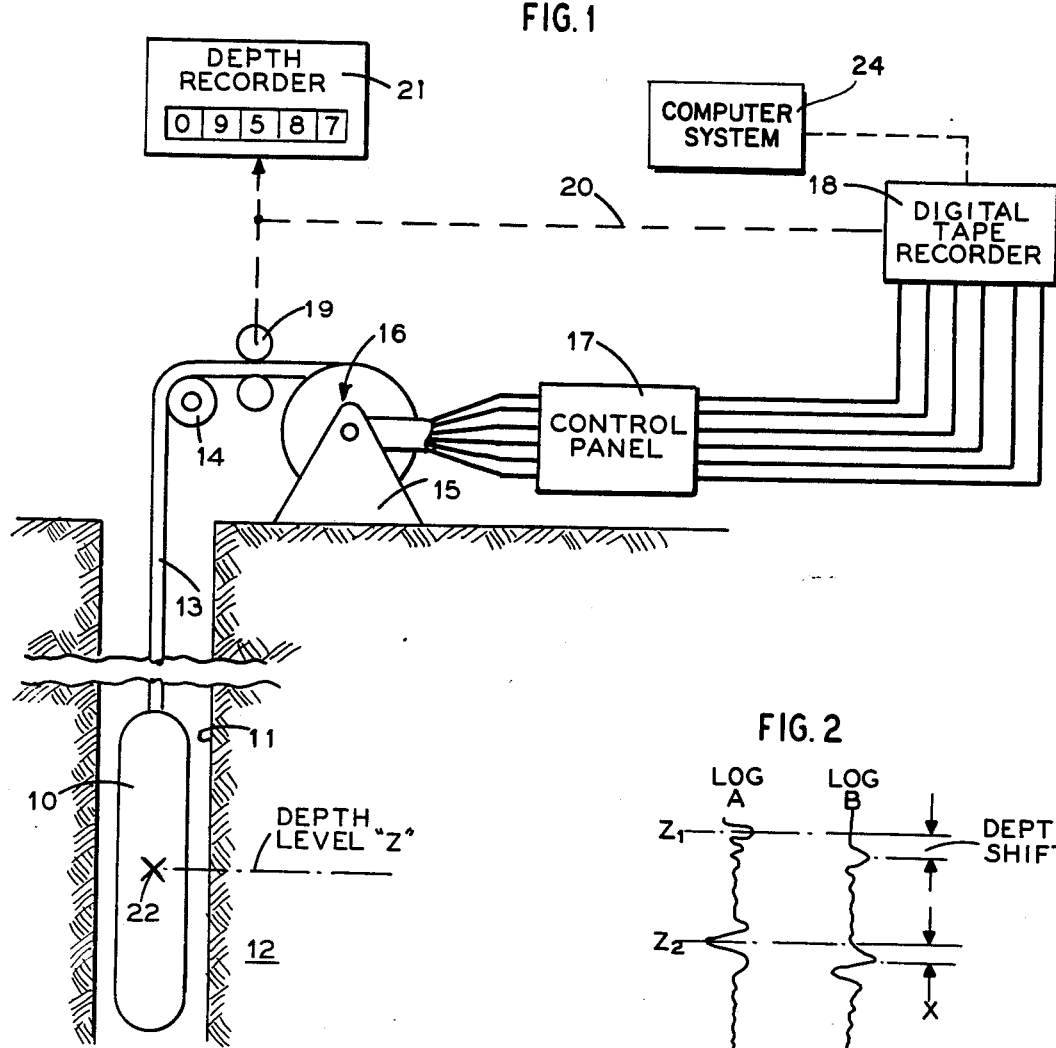
FIG. 1 shows an investigating device in a borehole along with apparatus at the surface of the earth for controlling the investigating apparatus and, recording the measurements and processing the data derived therefrom.

Now, referring to FIG. 1, there is shown an investigating device 10 in a borehole 11 for investigating subsurface earth formations 12. The investigating apparatus 10 is supported in a borehole 11 on an end of a cable 13. The cable 13 passes over a sheave wheel 14 and is secured to a drum and winch mechanism 15. The drum and winch mechanism 15 includes a suitable brush and slip ring arrangement 16 for providing electrical connections between the cable conductors and a control panel 17. The control panel 17 operates to supply power and control signals to the downhole investigating apparatus and includes suitable elctronic circuitry for receiving well logging measurements from the investigating apparatus and readying such measurements for application to a digital tape recorder 18. The tape recorder 18 is stepped as a function of depth by a driving wheel 19 which engages the cable 13 and mechanical linkage 20.

A detailed description of such a recording system may be found in U.S. Pat. No. 3,457,544 issued to G. K. Miller et al on July 22, 1969 entitled "METHOD AND APPARATUS FOR RECORDING WELL LOGGING DATA". The well logging data may be processed automatically by a properly programmed computer system 24 which receive the log data while logging directly from the recorder 18 or at some later time and/or remote location from the magnetic tape produced by the recorder 18.

The investigating apparatus 10 has a reference point 22 which constitutes the center or recording point of the investigating apparatus 10. Because of the long elastic cable 13, the investigating apparatus 10 is subject to displacement arising from cable stretch thus causing the true depth level to be different from the depth level registered by a depth recorder 21 derived from the driving wheel 19. The depth level registered by the depth recorder 21, which is identical with that registered by the tape recorder 18, is designated "Z". When attempting to depth-match a log produced by the investigating apparatus 10 with the log produced from another investigating apparatus passed through the borehole 11 at a different time, there is a distinct possibility that the logs recorded by the two investigating apparatus at the same depth level will not be referenced to the same depth level.

Figure 2:
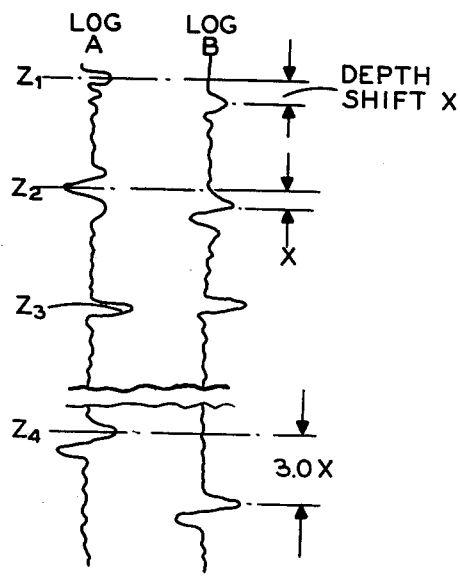
FIG. 2 is an example of logs produced from separate passes through a borehole.

Referring to FIG. 2, there are seen two logs, A and B, of the same or similar measurements made during different passes through a borehole. By observation it can be seen that the two logs have similar, though depth shifted, details. Considering the log A as the base log, it can be seen that at the depth level $Z_1$, log B is depth shifted an amount X from log A. The same holds true at depth level $Z_2$. Then at depth level $Z_3$, the two logs suddenly are depth matched, i.e., the depth shift is equal to 0. Then at depth level $Z_4$, the depth shift becomes 3X. When attempting to combine the associated elements of logs produced and recorded on the separate borehole passes A and B of FIG. 2, the results may well be in error because of the lack of depth matching.

It is the purpose of the present invention to utilize two similar logs made from separate passes through the borehole to correlate the depth levels of all logs produced during one pass with all logs produced during the second pass. Such similar logs are considered to be the same log, such a gamma ray log made on two separate passes, similar logs having similar characteristics such as two porosity logs made with different types of investigating devices, or logs which may be initially dissimilar but which can be made to appear similar as by combining two logs made during one pass to produce a third log for correlation with a log derived from a second pass through the borehole. In any event, this correlation is accomplished by utilizing the log fluctuations of logs A and B to indicate the amount of depth shift of one log relative to the other log.

Figure 3:
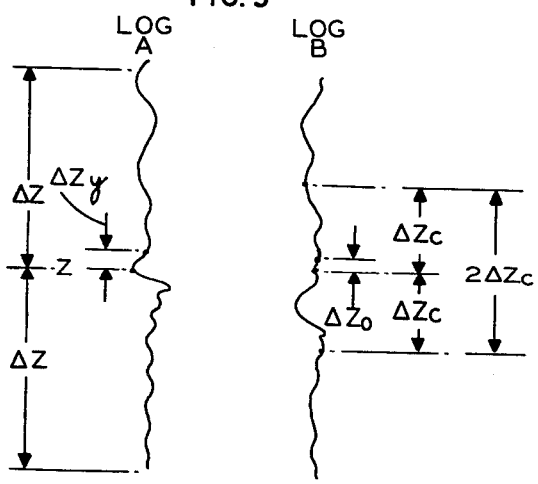
FIG. 3 represents the relationship between several parameters used in accordance with the present invention.

Turning now to FIG. 3 to define certain terms used herein, there are shown the two logs A and B to be correlated. The presently considered depth level, shown on log A in FIG. 3, is designated Z. This depth level Z for both logs A and B is initially the depth level given by the surface depth registering apparatus. Thus, for data recorded on magnetic tape, it is the depth indicia on the magnetic tape. The depth interval over which data is used to produce the correlation function $C_K$ (to be defined below) is designated the correlation interval, $2\Delta Z$. The depth interval which curves A and B are sampled in the correlation process is designated the sample interval $\Delta Z_o$, as shown in FIG. 3. Thus $2\Delta Z/\Delta Z_o + 1$ is the number of samples considered in the correlation interval and is designated n. The maximum amount by which curve B is displaced relative to curve A for any given depth level Z is, as shown in FIG. 3, designated $2\Delta Z_C$. This interval is called the search interval. After the logs A and B have been depth correlated at the depth level Z, the same process is repeated at a new depth level which is an interval $\Delta Z_Y$ from the presently considered level Z.

As a first step in the depth correlation process, one curve (in the case curve B) is effectively depth shifted one search step at a time relative to the other curve (curve A) and a correlation function $C_K$ is computed for each depth level. The search step is for simplicity considered to be $\Delta Z_o$, the same as the sample interval, but in practice could assume any value. The equation for computing the correlation function $C_K$ could take any desired form. A normalized root mean square equation has been found to give favorable results. This equation is:

$$C_K(Z) = \frac{n \sum_{i=0}^{m} A_{z-l+i} B_{z-h+i+K} - \sum_{i=0}^{m} A_{z-l+i} \sum_{i=0}^{m} B_{z-h+i+K}}{\sqrt{\left(n \sum_{i=0}^{m} A_{z-l+i}^2 - \left(\sum_{i=0}^{m} A_{z-l+i}\right)^2\right)\left(n \sum_{i=0}^{m} B_{z-h+i+K}^2 - \left(\sum_{i=0}^{m} B_{z-h+i+K}\right)^2\right)}} \quad (1)$$

where

A and B are the values of the two logs:

i is the sample interval number and increases between 0 and m where m is equal to $2\Delta Z/\Delta Z_o$;

K is the displacement number of log B relative to log A in samples and increases between 0 and $K_{MAX}$ such that $K_{MAX}\Delta Z_o$ is the search interval $2\Delta Z_c$;

z is the correlation step number in samples and corresponds to the depth level Z;

h is a depth offset for the B log in samples and is equal to $(\Delta Z + \Delta Z_c)/\Delta Z_o$;

l is a depth offset for the A log and is equal to $\Delta Z/\Delta Z_o$; and $C_K(Z)$ is the correlation factor for the displacement value of K at a depth level Z; n is the number of samples in the sample intervals and equals m+1. These parameters will be described in detail later.

Figure 4:
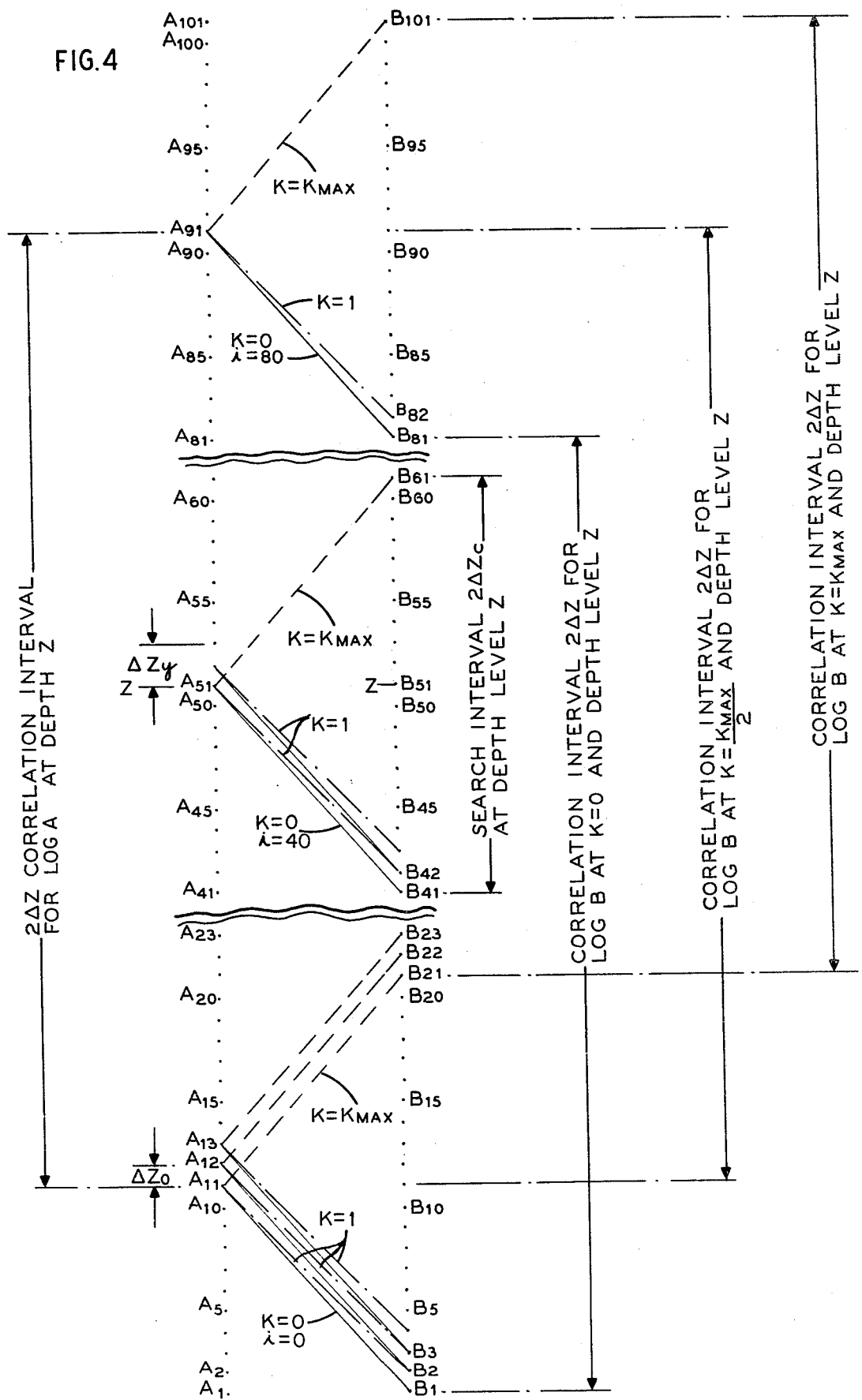
FIG. 4 shows two logs obtained from separate passes through a borehole for purposes of defining certain parameters used throughout this specification.

Turning now to FIG. 4, it will be described how the computation of the correlation factor $C_K$ takes place. In FIG. 4, there are shown the sample points versus depth for two logs A and B. The log values for the successive sample points for the two logs A and B are designated $A_1$, $A_2$, $A_3$, etc., and $B_1$, $B_2$, $B_3$, etc. Common subscripts for the logs A and B indicate common initial depth levels as they would be recorded as derived from the exploring devices run through the borehole. For exmples, the log value $A_1$ is initially assumed to be on depth with the log value $B_1$. Now, assume in FIG. 4 that the A and B logs at depth level Z are to be correlated. In this case, assuming the A log to be the base log, that point on the B log which corresponds in depth with the log value A at depth level Z is to be found and shifted, if necessary, to the depth level Z. Desirably, after such shifting, the data sample of the B log which was derived from the same depth level as the A log value at depth Z is now referenced to the depth level Z.

To accomplish this, a plurality of correlation functions $C_K(Z)$ are computed for given values of K between 0 and $K_{MAX}$ for the depth level Z under consideration where, as discussed earlier, K is equal to the displacement number in samples. Since the search step is $\Delta Z_o$, each increase of K by 1 will correspond to $\Delta Z_o$ depth shift on the log. For each value of K, $C_K$ is computed over the correlation interval $2\Delta Z$ from i=0 to i=m. Desirably, the correlation interval $2\Delta Z$ is substantially greater than the search interval $2\Delta Z_c$. Although it is not necessary that the depth interval between each sample used in producing the correlation function $C_K$ be the same as the search step $\Delta Z_o$ (i.e., that $\Delta Z_o$ be the interval for both i and K), such has been done for this example to simplify the illustration.

To explain how the correlation operation takes place, an example of such an operation will be described using FIG. 4. Assume that $\Delta Z_o$ is 6 inches, $\Delta Z_y$ is 12 inches, $\Delta Z$ is 20 feet, $\Delta Z_c$ is 5 feet and the first depth level to be correlated is that given by sample $A_{51}$. Furthermore, assume that the interval between successive data samples in FIG. 4 is 6 inches, e.g., $A_1$ to $A_2$ and $B_1$ to $B_2$ is 6 inches. In this situation, z will be initially set to 51 and l will be 40 (i.e., $\Delta Z/\Delta Z_o = 40$), h will be 50 (i.e., $(\Delta Z + \Delta Z_C)/\Delta Z_o = 50$), m will be 80 (i.e., $2\Delta Z/\Delta Z_o = 80$).

The first step is to compute $C_K$ for K=0. To accomplish this, in accordance with equation (1), $C_K$ for K=0 is computed taking into account all i's from i=0 to i=m. Thus, for the A·B term, initially, i is set equal to 0 and the A and B values combined in accordance with equation (1); then i is set equal to 1, 2 ... m in turn whereupon the combined A and B values are summed per equation (1) to produce $C_K$ for K=0. Taking the values given above for this example, for K=0 and i=0, $A_{z-l+i} = A_{51-40+0} = A_{11}$ will be combined with $B_{z-h+i+K} = B_{51-50+0+0} = B_1$; for i=1, $A_{12}$ with $B_2 \ldots$, and so on until i=m which is equal to 80, $A_{51-40+80} = A_{91}$ with $B_{51-50+80+0} = B_{81}$. The solid lines running between the A and B log values in FIG. 4 represent, for a few exemplary cases, how the A and B log values are combined to produce the product terms of equation (1) for summation. For the individual A and B summation terms $$\left( \text{e.g.,} \sum_{i=0}^{m} A_{z-l+i} \right),$$

The A and B log values for all i values between 0 and m are accumulated. Thus, for K=0, $A_{11}$ to $A_{91}$ are summed and $B_1$ to $B_{81}$ are summed. Then, all of the A·B product summation and individual A,B summation terms are combined in accordance with equation (1) to produce $C_K$ for K=0. In FIG. 4, the B log correlation interval $2\Delta Z$ for K=0 at depth level Z is shown. The B log over this depth interval is combined with the A log over its correlation interval $A_{11}$ to $A_{91}$. This A log correlation interval is the same for all values of K for K=0 through K=$K_{MAX}$ at depth level Z.

Next, K is incremented by 1 and $C_K$ computed in the same manner. Thus, considering the A·B term of equation (1), for K=1, at i=0, $A_{z-l+i} = A_{51-40+0} = A_{11}$ is combined with $B_{z-h+i+K} = B_{51-50+0+1} = B_2$; for i=1, $A_{51-40+1} = A_{12}$ with $B_{51-50+1+1} = B_3$; and so on until i=m, $A_{51-40+80} = A_{91}$ with $B_{51-50+80+1} = B_{82}$. The dash-dot lines running between the A and B logs shows, for a few illustrative log samples, how the A and B log values are combined. The individual A summation terms will be the same for all K's at any given Z since the A terms are not depth dependent on K. However, for the B terms which are depth dependent on K, $B_2$ to $B_{82}$ will be summed for K=1.

This same process is repeated for all K values to $K_{MAX}$ which, in this example, is 20. Considering the A·B term for $K_{MAX}$(K=20) at i=0, $A_{z-l+i} = A_{51-40+0} = A_{11}$ will be combined with $B_{z-h+i+K} = B_{51-50+0+20} = B_{21}$; at i=1, $A_{51-40+1} = A_{12}$ with $B_{51-50+1+20} = B_{22}$; and so on until at i=m=80, $A_{51-40+80} = A_{91}$ will be combined with $B_{51-50+80+20} = B_{101}$. This is represented in FIG. 4 by the dashed lines. For the B summation terms of equation (1), $B_{21}$ to $B_{101}$ will be used. The B log correlation interval for K=$K_{MAX}$ is shown in FIG. 4 as extending between $B_{21}$ and $B_{101}$ and is combined with the A log over its correlation interval $A_{11}$ to $A_{91}$. Also shown in FIG. 4 is the B log correlation interval for K=$K_{MAX}$/2. As seen in FIG. 4, the depth intervals for the A and B logs exactly coincide for K=$K_{MAX}$/2. In other words, the subscripts for A·B terms used in equation (1) are identical when K=$K_{MAX}$/2 for all i's between 0 and m.

At this point, the $C_K$ values for K between 0 and $K_{MAX}$ have been computed. The best fit between the two logs at depth level Z (Z=51) occurs at that K where $C_K$ is a maximum. This K is designated K'. The corresponding displacement in samples will be K'-$K_{MAX}$/2 since at K=$K_{MAX}$/2, the A and B log values are referenced to common depth levels as stated above. Taking an example of this using the values given above, if K' is found to be 9, then K'-$K_{MAX}$/2 will be 9-10=-1, thus indicating that the depth displacement between the two logs is -1 sample or -6 inches. In this case, the B log value $B_{50}$ will be deemed, as a first assumption, to be that sample of the B log which was derived at the same depth level Z as the A log sample $A_{51}$.

From the foregoing, it can be seen that the B log correlation interval is moved relative to the A log correlation interval for different values of K while computing values of $C_K$ for such different values of K to thereby determine the best correlation or fit between the two logs. Once the best fit is determined, the corresponding depth displacement can be determined. As will be established later, the depth displacement determined by this process is only a first assumption value which may be improved upon.

To determine the depth displacement at the next depth level which is an interval $\Delta Z_y$=12 inches away (for the present example), z is incremented by 2 and the same operation repeated, i.e., $C_K$ for all K's between 0 and $K_{MAX}$ are computed, etc.

Unfortunately, there are factors which may upset the correlation operation just described and which will give numerically low correlation factors $C_K$ at K'. For example, a bad log reading caused by a malfunction in the investigating apparatus, or noise, can cause such a low correlation factor. To prevent an erroneous depth displacement indication upon such an occurrence, $C_{K(MAX)}$ is compared with a number $C_{K(lim)}$ representing the lowest acceptable value of $C_{K(MAX)}$ and if $C_{K(MAX)}$ is lower than $C_{K(lim)}$, the corresponding depth shift is disregarded. In its place, the last acceptable depth displacement is used.

It has been found that the discarding of all depth displacement indications resulting from low correlation factors $C_K$ is not sufficient to prevent occasional errors arising in the depth correlation process. To further improve the accuracy of the depth correlation process, in accordance with an important feature of the present invention, a history file of the depth displacements is produced and utilized to statistically improve the accuracy of the depth correlation process. To accomplish this, a prescribed number of depth displacements of the same magnitude at successive depth levels are required before that depth displacement is declared valid. Once a given depth displacement is declared valid, it takes a prescribed number of occurrences of a different depth displacement quantity before the new depth displacement quantity will be substituted for the old.

Before considering this statistical analysis in detail, it would first be desirable to consider some definitions. The computed depth displacement or depth shift at any given level Z is designated SH(Z), the declared depth displacement is designated $SH_D$, and the stored depth displacement is designated $SH_s$. The number of occurrences of any given depth displacement is designated HC (for history counter). Prior to the time a depth displacement is declared, the number of consecutive (depthwise) occurrences of such a depth displacement is designated UDC (for undeclared displacement counter). The prescribed number of consecutive occurrences of a given displacement shift which are necessary to cause that displacement to be declared, is designated $UDC_{MIN}$. The number of depth levels Z considered for each declared displacement is designated LEVEL.

Turning now to FIG. 5, there is shown a table giving representative values of an illustrative example of how depth displacements may be declared. Each row in FIG. 5 is considered to be a separate depth level $Z_N$. Assume that $UDC_{MIN}$ is equal to 2. Furthermore, assume that the last declared displacement SH is 1 at $Z_o$. At the beginning of any history all shifts are set to zero. At the first depth level $Z_1$, the computed displacement SH(Z) is 0. As shown in FIG. 5 the computed displacement SH(Z) at the next depth level $Z_2$ is also 0, and since $UDC_{MIN}$ is equal to 2, the value of $SH_D=0$ is declared and UDC reset to 0. $SH_D$ is set equal to 0. In addition, each of the continuous SH(Z) values making up this history is then used to re-define corresponding $SH_D$ values. Thus $SH_D$ at $Z_1$, which was 1, is re-defined as its SH(Z), 0. Then at the depth level $Z_3$, SH(Z) is found to be 1 and UDC incremented. However UDC at this time is only equal to 1 and thus $SH_D$ remains at 0. Then at the next depth level $Z_4$, an SH(Z) of 2 is computed. Since a different displacement value was computed at the last depth level $Z_3$, the declared displacement remains at 0 and UDC remains at 1. Then at depth level $Z_5$, SH(Z)=1 is again computed. However, to declare a new displacement, two consecutive values of the same displacement must be computed. Thus the declared displacement remains at 0. The same is true for depth level $Z_6$, $Z_7$, and $Z_8$ where computed displacements of 3, 1, and 0 are computed. Since each displacement is different from the last, UDC remains at 1. Then at depth level $Z_9$ and $Z_{10}$ two consecutive SH(Z) displacement values of 1 are computed such that UDC equals $UDC_{MIN}$ and SH(Z) (=1) is declared as $SH_D$ at both $Z_{09}$ and $Z_{10}$. At depth levels $Z_{11}$ and $Z_{12}$ the declared shift of 1 remains.

Figure 6A:
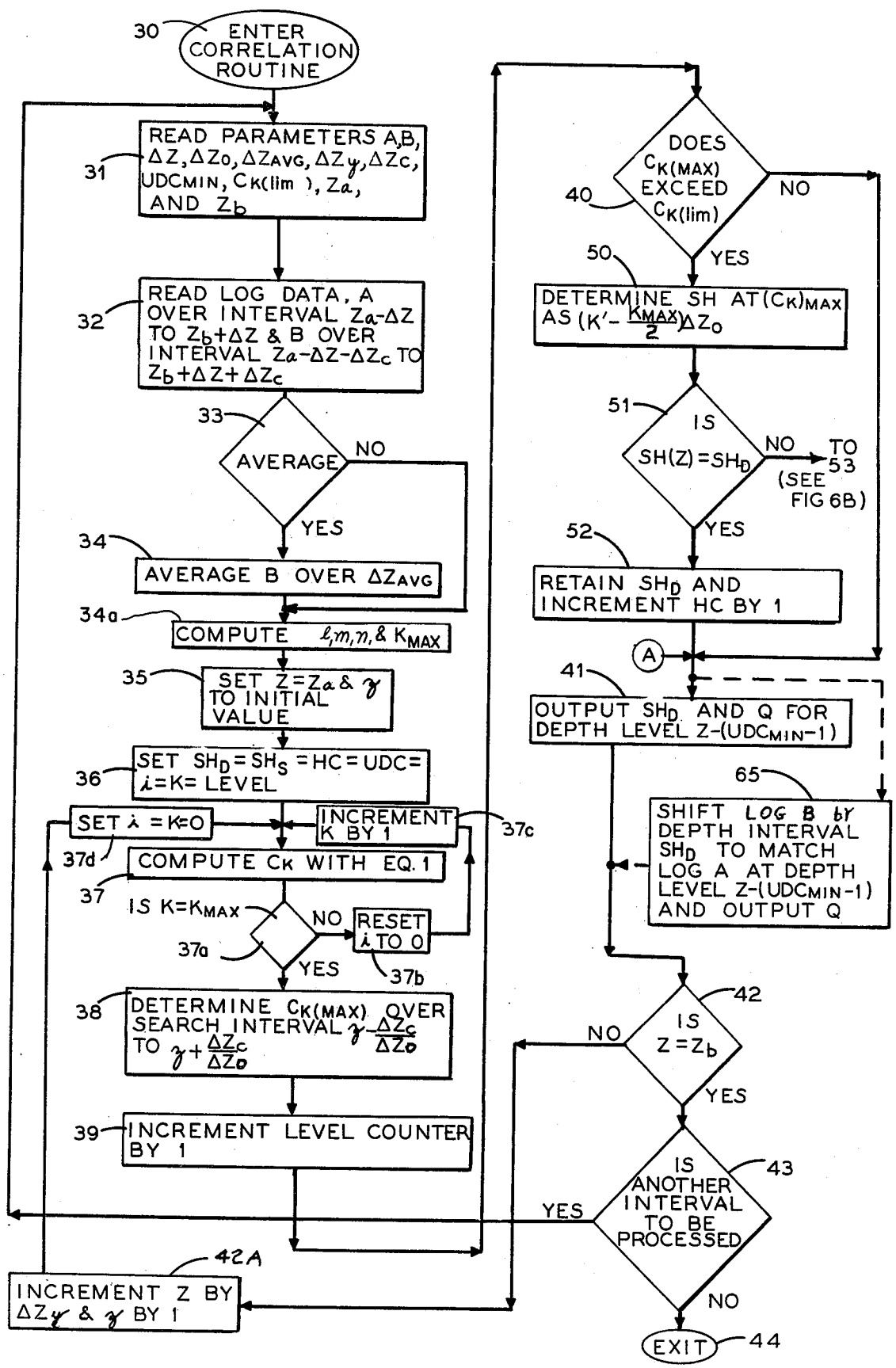
FIGS. 6A and 6B show a computer flow diagram representation of how the techniques of the present invention might be implemented.
Figure 6B:
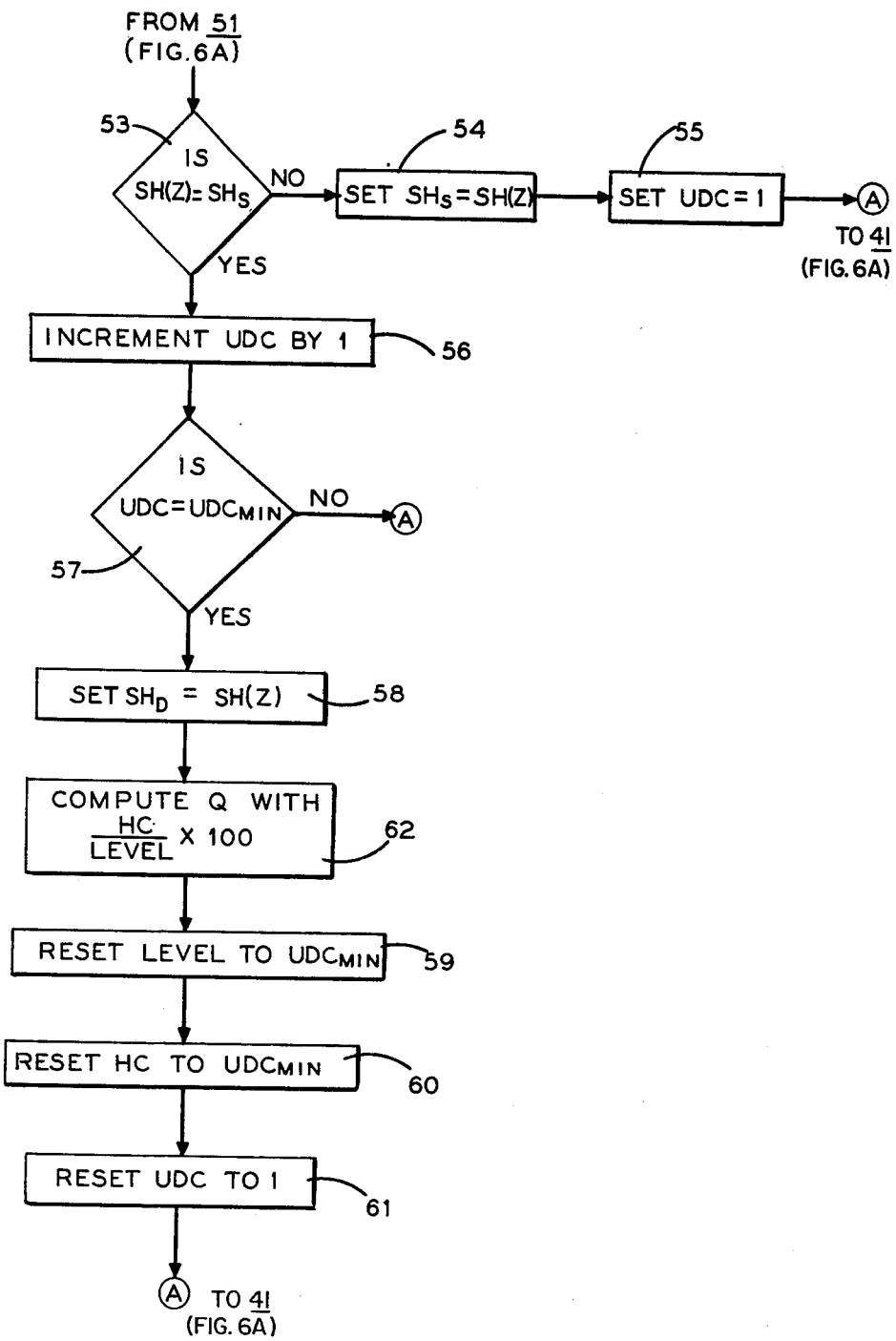

Now turning to FIGS. 6A and 6B, there is shown a flow diagram depicting a representative implementation of the techniques of the present invention. First, refer to FIG. 6A. After the depth correlation routine is entered (element 30), the various parameters used by the program are read as represented by element 31. This includes the designation of the logs A and B which are to be used in the correlation process, as well as the above discussed constants $C_{K(lim)}$, $\Delta Z$, $\Delta Z_o$, $\Delta Z_C$, $\Delta Z_S$, $\Delta Z_y$, $UDC_{MIN}$ as well as a depth interval $\Delta Z_{Avg}$ representing a depth interval over which the B log, can if desired, be averaged. Additionally, the lowest and highest depth levels to be correlated, designated $Z_a$ and $Z_b$ respectively, are read, i.e., the depth interval over which the depth correlation is to be performed.

Next, as represented by a block 32, the log data A over the depth interval $Z_a-\Delta Z$ to $Z_b+\Delta Z$ is read and the log data B over the interval $Z_a-(\Delta Z+\Delta Z_C)$ to $Z_b+(\Delta Z+\Delta Z_C)$ is read. Next, as represented by the decision element 33, a decision is made as to whether the B log is to be averaged and if so, as represented by block 34, it is averaged using the averaging interval $\Delta Z_{Avg}$. If the B log is not to be averaged, block 34 is by-passed. Since the FIG. 6A flow diagram has provisions for averaging only the B log, that log which is not to be averaged will always be considered as the A log in block 31. If desired, both the A and B logs could be averaged.

Now with the values of the logs A and B over the necessary depth intervals stored in memory, the correlation process is ready to begin. As a first step, it is convenient to reiterate at this point some parameters earlier defined which will be used in the computations to follow. These preliminary definitions are represented by blocks 34a, 35 and 36 of FIG. 6A. The computation of the values defining $1=\Delta Z/\Delta Z_o$, $h=(\Delta Z+\Delta Z_C)/\Delta Z_o$, $m=2\Delta Z/\Delta Z_o$, $n=m+1$ and $K_{MAX}=2\Delta Z_C/\Delta Z_o$ is represented by block 34a. The initial value for Z is set equal to $Z_a$ and z is set equal to its initial value, as represented by block 35. As discussed earlier, z is the depth sample number and represents a given sample of data in memory. Initially, z will be equal to $(\Delta Z+\Delta Z_C)/\Delta Z_o+1$ if the data samples for the first depth level considered are at z=1, i.e., $A_1$ and $B_1$. Then as represented by block 36, $SH_D$, $SH_S$, HC, UDC, LEVEL, i and K are set equal to 0.

Now, $C_K$ for all values of K can be computed using equation (1) over the depth interval $Z-\Delta Z$ to $Z+\Delta Z$ where initially Z is equal to $Z_a$. To accomplish this operation is the function represented by blocks 37, 37a, 37b and 37c in FIG. 6A. As represented by element 37, $C_K$ is computed using equation (1) where initially K=0. The operation depicted by block 37, of course, includes a number of individual steps which are not shown in FIG. 6A since it is well known how to perform such an operation. Briefly, such an operation could be implemented essentially as was described in connection with FIG. 4. Namely, i could be incremented one unit at a time to accumulate the appropriate $A_{z-l+i}$ and $B_{z-h+i+K}$ values to produce the $$\sum_{i=0}^{m} A_{z-l+i} \text{ and } \sum_{i=0}^{m} B_{z-h+i+K}$$

terms of equation (1) and the appropriate $A_{z-l+i}$ and $B_{z-h+i+K}$ terms multiplied together and accumulated to produce the $$\sum_{i=0}^{m} A_{z-l+i} \cdot B_{z-h+i+K}$$

term of equation (1). These accumulated terms can then be combined in accordance with equation (1) to produce $C_K$.

Once $C_K$ is computed, it is determined if $K=K_{MAX}$ as represented by decision element 37a. If not, i is reset to 0 and K is incremented by 1, as represented by blocks 37b and 37c. The program then returns to block 37 to compute a new $C_K$. The program continues around this loop until $C_K$ is computed for all K's from K=0 to $K_{MAX}$. Once $C_K$ for $K = K_{MAX}$ has been computed, the answer to the question asked by decision element 37a is yes and the program proceeds to processing block 38 to begin the determination of $C_{K(MAX)}$ and the corresponding depth shift between Z and the depth level where $C_K$ is a maximum over the interval $Z - \Delta Z_C$ to $Z + \Delta Z_C$. As stated earlier, this depth shift is equal to $(K' - K_{MAX}/2)\Delta Z_o$. The determination of $C_{K(MAX)}$ is represented by block 38 of FIG. 6A. As represented by block 39, the LEVEL counter is then incremented by 1. Next it is determined if $C_{K(MAX)}$ exceeds $C_{K(lim)}$ as represented by decision element 40 and if not, the last declared depth shift $SH_D$ is outputted at the appropriate depth level as represented by the element 41. As stated earlier, the newly declared depth displacement is outputted not only for the presently considered depth level Z but also for those preceding depth levels which led to the declaration of this new depth displacement. In general terms, $SH_D$ is outputted each time for depth level $Z - (UDC_{min} - 1)$. It is determined if Z is equal to $Z_b$, as represented by decision element 42. If $Z < Z_b$, the program increments Z by $\Delta Z_y$ and z by 1 as depicted by block 42A and returns to element 37 to determine the depth shift SH for the next depth level. If Z is equal to $Z_b$, it is determined if another interval is to be processed as represented by decision element 43, and if so, the program returns to the elements 31 and 32 to read a new set of data to correlate another interval of log data. If another interval is not to be processed, the program exits the depth correlation routine.

Returning to the decision element 40, if $C_{K(MAX)}$ exceeds $C_{K(lim)}$, the depth shift SH at the depth level Z presently under consideration, i.e., SH(Z), is determined in accordance with the relationship $SH(Z) = (K' - K_{MAX}/2)\Delta Z_o$ as represented by block 50. It is next determined if the newly computed depth shift SH(Z) is equal to the declared depth shift $SH_D$, as represented by the decision element 51. If the two parameters are equal, the presently declared depth shift $SH_D$ is retained and the history counter HC is incremented by 1, as represnted by element 52. The program proceeds to output $SH_D$ at the appropriate depth level and then considers the next depth level, or if the entire interval has been processed, go to another interval or exit the routine (see elements 42, 43, and 44). On the other hand, if the presently computed depth shift SH(z) is not equal to the declared depth shift $SH_D$, the program determines if a new depth shift should be declared. This operation is represented by the elements 53 through 58 of FIG. 6B.

Considering this new depth shift determination operation in detail, first, it is determined if the depth shift for the present level Z, i.e., SH(Z), is equal to the stored depth shift $SH_S$, as represented by decision element 53. (The step depicted by element 36 sets $SH_S$ to 0 initially). If they are not equal, $SH_S$ is set equal to SH(Z) as represented by element 54 and the undeclared displacement counter is set equal to 1 as represented by element 55. The reason for this is evident from the discussion of FIG. 5 where it was set forth that the prescribed consecutive number of identical depth shifts ($UDC_{MIN}$) must be computed before a new depth shift is declared. It is the undeclared shift counter UDC which keeps track of the consecutive number of shifts. Since SH(Z) and $SH_S$ were not of the same magnitude, when the program goes to elements 54 and 55, a new shift was not declared, the program outputs the presently declared shift value $SH_D$ at depth level $Z - (UDC_{MIN} - 1)$ and proceeds to consider the next depth level. (See elements 41 through 44).

If SH(Z) is equal to $SH_S$, then the undeclared shift counter UDC is incremented by 1 as represented by element 56 and it is determined if UDC is equal to $UDC_{MIN}$ as represented by element 57. If UDC $\neq (UDC)_{MIN}$, a new shift cannot be declared yet, and the program outputs the present declared shift value $SH_D$ and proceeds to the next depth level. (See elements 41-44). If UDC is equal to $UDC_{MIN}$, the value of SH computed at the presently considered depth level Z, SH(Z), is used to reset $SH_D$, i.e., a new shift is declared, as is represented by element 58.

After a new $SH_D$ is declared, the LEVEL and HC counters are set to $UDC_{MIN}$ and UDC is set to 1, as represented by elements 59, 60, and 61 in readiness for the determination of a new declared shift. Then the program proceeds to output the newly declared shift value $SH_D$ for the approriate depth level Z, i.e., depth level Z at the beginning of the accepted history. It then proceeds to the next depth level, etc.

If desired a quality facor Q could be computed representing the percentage of depth levels for which each declared shift occurred, as represented by the element 62. This quality factor Q can be computed with the expression:

$$Q = \frac{HC}{LEVEL} \times 100 \tag{2}$$

With equation (2), Q = 100% represents perfect correlation. Referring to FIG. 5 to give an illustrative example of how Q is derived, a depth shift of 0 was declared at depth level $Z_2$ and this depth shift was computed three times throughout the interval when 0 was the declared depth shift, i.e., $Z_1$ through $Z_8$. Thus, the quality factor Q for this example would be 38% since HC would be equal to 3 (depth level $Z_1$, $Z_2$ and $Z_8$) and LEVEL would be equal to 8.

The above-described operation has produced numerical outputs giving the depth shift between the two logs A and B at each depth level. (See element 41.) A log analyst could then shift the log B relative to log A by the indicated amount by a suitable technique. Alternatively, the program could automatically shift the log B by the declared shift interval $SH_D$ to match the log A at the appropriate depth level. This operation is depicted by the element 65 in FIG. 6A. This operation would take the form of assigning the log value of B at the depth level $Z - (UDC_{MIN} - 1) - SH_D$ to the depth level $Z - (UDC_{MIN} - 1)$. The same thing will apply to all logs derived from investigating devices on the same investigating apparatus which produced log B. Such a shift operation is straightforward and well known and need not be discussed further here.

Summarizing the depth correlation operation depicted in FIGS. 4, 5, and 6, the two logs to be correlated are initially considered to be depth matched in accordance with the depth indicia on the magnetic tape on which the log data is recorded. Beginning at the initial depth level $Z_a$, a first assumption value of the depth displacement is computed between the B log and the A log at each selected depth level from $Z_a$ to $Z_b$ in increments of $\Delta Z_y$. Thus, the A log is considered to be the base log and the displacement for the B log relative to the A log is computed. Of course, the A log may not be accurately depth referenced itself but when combining logs for computational purposes to achieve better well log interpretation data, the depth correlation between the combined logs is the most important item. If "absolute" depth accuracy is desired, the methods disclosed in the aforementioned Gollwitzer patent could be utilized in conjunction with the techniques of the present invention.

Concerning the depth correlation process at one depth level, the B log is effectively shifted one step $\Delta Z_o$ at a time and a correlation function $C_K$ is computed at each such step with equation (1). Once the $C_K$'s over the entire search interval $2\Delta Z_C$ are computed, that K which produced the maximum value of $C_K$, designated K', is determined. The corresponding depth displacement will be $(K' - K_{MAX}/2)\Delta Z_o$. Thus, for example, if $\Delta Z_o$ is 1 inch and $(K' - K_{MAX}/2)$ is $-6$, the computed depth displacement for log B at the presently considered depth level Z will be $-6$ inches. However, this depth displacement is not computed unless $C_{K(MAX)}$ is equal to or greater than $C_{K(lim)}$. This prevents weak correlation quantities from causing depth displacements. If $C_{K(MAX)}$ is greater than $C_{K(lim)}$, the displacement $SH(Z)$ is computed and entered into the history file for statistical analysis. This computed value $SH(Z)$ is only a first assumption of the depth displacement which may be changed by the statistical analysis.

This statistical analysis takes the form of declaring a depth displacement only when a consecutive number of identical depth displacements have been computed. (Consecutive meaning consecutive depth levels.) By so doing, an occasional erroneous depth displacement caused by noise, for example, will not cause log B to be depth displaced.

There has been described a technique for accurately depth correlating logs produced from independent passes through a borehole. This has been accomplished by taking two similar logs from separate passes through the borehole and matching them through a correlation technique. The validity of this correlation technique has been strengthened by a statistical analysis of the results to prevent occasional errors from upsetting the operation. In FIGS. 6A and 6B, this statistical analysis has taken the form of delaying the declaration of a new depth displacement until a designated number of computed depth displacements of a given value have been produced. Knowing the delay, since it is accounted for, the displacement can be applied to the appropriate length, i.e., where the delay began. Of course, there are more elaborate techniques which could be utilized and which are encompassed within the present invention. For example, the threshold level for declaring a new displacement $SH_D$ could be functionally dependent on the quality factor Q. Thus as Q decreases, $UDC_{MIN}$ could correspondingly increase to make it more difficult to declare a new displacement.

While there has been described what is at present considered to be a preferred embodiment of this invention, it will be obvious to those skilled in the art that various changes and modifications may be made therein without departing from the invention, and it is, therefore, intended to cover all such changes and modifications as fall within the true spirit and scope of the invention.

What is claimed is:

1. A method of filtering a selected well log and of producing a tangible representation of the resulting improved, filtered log, said filtering including depth-shifting samples of the selected log relative to a base well log on the basis of depth displacements between said logs whicch have been found to be the least ambiguous ones among a greater number of possible such depth displacements, each of said logs being derived from a respective investigating device passed through a borehole and sampled at separate depth levels, comprising the following steps each of which is carried out by a machine:

(a) producing first and second data signals which correspond to samples which are derived from separate depth levels in a borehole and make up said base log and said selected log respectively;

(b) determining the depth displacement between a selected sample of said first data signals and a corresponding sample of said second data signals which is assumed, as a first assumption, to be derived from the same depth level as said selected sample of first data signals;

(c) repeating said step of determining the depth displacement between a number of successive selected samples of said first data signals and corresponding samples of second data signals;

(d) comparing the depth displacements determined from a number of successive samples for selecting one of said depth displacements as a more accurate depth displacement representation for at least one of said successive samples and for selecting at least one other one of said depth displacements as a more accurate depth displacement representation for at least one other one of said successive samples; and (e) filtering said selected log by depth-shifting samples thereof relative to the base log on the basis of the depth displacements selected in the immediately preceding step and producing a tangible representation of the resulting filtered well log.

2. A method of filtering a selected well log and of producing a tangible representation of the resulting improved, filtered log, said filtering including depth shifting samples of the selected log relative to a base well log on the basis of depth displacements between said logs which have been found to be the least ambiguous ones among a greater number of possible such depth displacements, each of said legs being derived from a respective investigating device passed through a borehole and sampled at separate depth levels, comprising the following steps each of which is carried out by a machine:

(a) producing first and second data signals corresponding to samples derived from separate depth levels in a borehole and making up said base log and selected log respectively;

(b) determining a first assumption value of the depth displacement between a selected sample of said first data signals and a corresponding sample of said second data signals;

(c) repetitively performing said step of determining a first assumption value of depth displacement for a number of successive selected samples of said first data signals;

(d) comparing the first assumption values of depth displacements determined from a number of successive selected samples for selecting one of said depth displacements as the final depth displacement value if such value occurred for a selected number of samples; and (e) filtering said selected log by depth-shifting samples thereof relative to the base log on the basis of said final displacement value and producing a tangible representation of the resulting filtered well log.

3. The method of claim 2 wherein the steps of comparing depth displacements for selecting one such depth displacement as the final value includes the steps of comparing the depth displacement values for at least two consecutive selected samples of said first data signals from at least two consecutive depth levels to determine if such values for consecutive selected samples are identical, and declaring the depth displacement value for such consecutive selected samples as the final depth displacement value for at least some of such samples if such depth displacement values for consecutive selected samples are identical.

4. A method of filtering a selected well log and of producing a tangible representation of the resulting improved, filtered logs, said filtering including depth-shifting samples of the selected log relative to a base well log on the basis of depth displacements between said logs which have been found to be the least ambiguous ones among a greater number of possible such depth displacements, each of said logs being derived from a respective investigating device passed through a borehole and sampled at separate depth levels, comprising the following steps each of which is carried out by a machine:
(a) producing first and second data signals corresponding to samples derived from separate depth levels in a borehole which are referenced to initial depth levels, said first data signals comprising said base log and said second data signals comprising the selected log;
(b) combining samples of said first data signals over a first interval with samples of said second data signals over a second interval while adjusting said second interval to determine the best likeness between said first and second data signals over said intervals and the corresponding depth displacement between a selected sample of said first data signals within said first interval and a sample of said second data signals within said second interval wherein said samples for which depth displacement is determined are assumed, as a first assumption, to be derived from the same borehole depth level;
(c) repetitively performing said step of combining samples to determine the depth displacement for a number of successive selected samples of said first data signals to thereby determine the depth displacement between such successive selected samples of first data signals and corresponding samples of second data signals, said successive selected samples of said first data signals being referenced to successive initial depth levels;
(d) comparing the depth displacements determined for a number of successive selected samples for selected one of said depth displacements as a more accurate depth displacement representation; and
(e) filtering said selected log by depth-shifting samples thereof on the basis of the more accurate depth-displacement representation selected in the immediately preceding step and producing a tangible representation of the resulting filtered well log.

5. A method of filtering a selected well log and of producing a tangible representation of the resulting improved, filtered log, said filtering including depth-shifting samples of the selected log relative to a base well log on the basis of depth displacements between said logs which have been found to be the least ambiguous ones among a greater number of possible such depth displacements, each of said logs being derived from a respective investigating device passed through a borehole and sampled at separate depth levels, comprising the following steps each of which is carried out by machine:
(a) producing first and second data signals corresponding to samples derived from separate depth levels in a borehole which are referenced to initial depth levels, said first data signals comprising said base log and said second data signals comprising said selected log;
(b) combining the samples of said first data signals over a first interval with samples of said second data signals over a second interval of the same length as the first interval while varying the relative positioning of said second interval to determine the best likeness between said first and second data signals over said intervals and the corresponding depth displacement between a selected sample of said first data signals within said first interval and a sample of said second data signals within said second interval wherein said samples for which depth displacement is determined are assumed, as a first assumption, to be derived from the same borehole depth level;
(c) repetitively performing said step of combining samples to determine the depth displacement for a number of successive selected samples of said first data signals to thereby determine the depth displacement between such successive selected samples of first data signals and corresponding samples of second data signals, said successive selected samples of said first data signals being referenced to successive initial depth levels;
(d) comparing the depth displacements determined for a number of successive selected samples for selecting those depth displacements which are more likely accurate as final depth displacement values; and
(e) filtering the selected log by depth-shifting samples thereof on the basis of the depth displacements selected in the immediately preceding step as more likely accurate, and producing a tangible representation of the resulting filtered well log.

6. A method of filtering a selected well log and of producing a tangible representation of the filtered log, said filtering including depth-shifting samples of the selected log relative to a base well log on the basis of depth-displacements between said logs which have been found to be the least ambiguous ones amoung a greater number of possible such depth displacements, each of said logs being derived from a respective investigating device passed through a borehole and sampled at separate depth levels, comprising the following steps each of which is carried out by a machine:
(a) producing first and second data signals corresponding to samples derived from separate depth levels in a borehole which are referenced to initial depth levels, said first data signals comprising said base log and said second data signals comprising said selected log;
(b) combining samples of said first data signals over a first interval with samples of said second data signals over a second interval while adjusting said second interval to determine the best depth correlation between said first and second data signals over said intervals and the corresponding first assumption depth displacement between a selected sample of said first data signals within said first interval and a sample of said second data signals within said second interval wherein said samples for which first assumption depth displacement is determined are assumed, as a first assumption, to be derived from the same borehole depth level;

(c) repeating said step of combining samples to determine the first assumption depth displacement for a number of successive selected samples of said first data signals to thereby determine the first assumption depth displacement between such successive selected samples of first data signals and corresponding samples to second data signals, said successive selected samples of said first data signals being referenced to successive initial depth levels;

(d) comparing the first assumption depth displacements determined for a number of successive selected samples for selecting one of said first assumption depth displacements as the final depth displacement value if such value occurred for a predetermined number of successive selected samples; and (e) filtering the selected log by depth-shifting samples thereof, or values derived from samples thereof, on the basis of said final displacement value, and producing a tangible representation of the resulting filtered selected well log.

7. The method of claim 6 wherein the step of comparing for selecting further includes the steps of comparing the first assumption depth displacement for each successive initial depth level with that value from at least one previously considered initial depth level and producing a coincidence output for each successive depth level if such compared first assumption depth displacements are identical, counting the occurrences of such coincidence outputs to produce an accumulated count of such coincidence outputs, comparing the accumulated count with a predetermined number, and declaring the value of such identical first assumption depth displacements as the final depth displacement value for at least one of the considered initial depth levels if such accumulated count is at least as great as the predetermined number.

8. The method of claim 7 and further including the steps of counting the number of successive initial depth levels between declarations of a given final depth displacement value to produce a first count, counting the total number of initial depth levels for which first assumption depth displacement values identical to said given final depth displacement value occur to produce a second count, and combining said first and second counts to produce an indication of the quality of the final depth displacement value over a given depth interval.

9. The method of claim 7 and further including the steps of counting the number of successive initial depth levels in a given depth interval between declarations of a given final depth displacement to produce a first count, counting the total number of initial depth levels in said depth interval for which first assumption depth displacement values identical to said given final depth displacement value occur to produce a second count, and combining said first and second counts to produce an indication of the quality of the final depth displacement value over said given depth interval.

10. A method of filtering a selected well log and of producing a tangible representation of the resulting improved, filtered log, said filtering including depth-shifting samples of the selected log relative to a base well log on the basis of depth-displacements which have been found to be the most likely to be the accurate ones from amoung a greater number of possible such depth displacements, each of said logs being derived from a respective investigating device passed through a borehole and sample at separate depth levels, comprising the following steps each of which is carried out by a machine:

(a) producing first and second data signal corresponding to samples derived from separate depth levels in a borehole, said first and second data referenced to initial depth levels, and said first data signals comprising said base log and said second data signals comprising said selected log;

(b) determining the depth displacement between a selected sample of said first data signals and a corresponding sample of said second data signals which is assumed, as a first assumption, to be derived from the same depth level as said selected sample of first data signals, including combining samples of said first data signals over a first selected depth interval encompassing said first data signals selected sample with samples of said second data signals over a second selected depth interval encompassing said second data signals sample which is assumed to be depth matched with said first data signals selected sample to produce a correlation function, repetitively performing said step of combining while moving one of said first or second selected depth intervals one step at a time relative to the other of said selected depth intervals to produce a plurality of correlation functions, determining which one of said correlation functions is greater than the other of said correlation functions and the corresponding displacement of the initial depth levels to which said first data signals selected sample and corresponding second data signals sample are referenced for said greater correlation function, whereby said displacement will be indicative of a first assumption value of the depth displacement of one sample each of said first and second data signals to another;

(c) repetitively performing said step of determining a first assumption value of the depth displacement for selected samples of said first data having different successive initial depth levels;

(d) statistically analyzing said first assumption depth displacement values to determine which displacement are most likely accurate; and (e) filtering the selected log by depth-shifting samples thereof, or values derived from samples thereof, on the basis of the displacements determined to be most likely accurate in the immediately preceding step, and producing a tangible representation of the resulting filtered well log.

11. The method of claim 10 wherein said step of statistically analyzing said first assumption depth displacement values includes the steps of comparing first assumption depth displacement values from a plurality of successive initial depth levels and outputting one of said first assumption depth displacement values as the final depth displacement value for at least one of said plurality of initial depth levels upon said final value occurring in a predetermined relationship relative to depth.

12. The method of claim 11 and further including the step of transferring the depth levels to which successive samples of said second data are initially referenced by an amount determined by the final depth displacement value determined for such successive samples so that samples of first and second data derived from the same depth level in the borehole will be ultimately referenced to the same depth level.

13. A method of filtering a selected well log and of producing a tangible representation of the resulting filtered log, said filtering including depth-shifting samples of the selected log relative to the base well log on the basis of depth-displacements which have been found to be more likely to be accurate than other such displacements, each of said logs being derived from a respective investigating device passed through a borehole and sampled at separate depth levels, comprising the following steps each of which is carried out by a machine:

(a) producing first and second data signals corresponding to samples of said logs derived at separate depth levels which are referenced to an initial depth level, said first and second data signals comprising said base log and selected log respectively;

(b) determining a displacement between a selected sample of said first data signals and a corresponding sample of said second data signals which sample is assumed to be derived with a predetermined displacement from said selected sample of first data signals;

(c) repetitively performing said step of determining a displacement to determine a plurality of displacements between a number of selected samples of said first data signals and corresponding samples of said second data signals;

(d) comparing the plurality of displacements determined for a number of samples of first and second data signals for the purpose of selecting one of said determined displacements as a more accurate displacement representation between selected samples of said first data signals and corresponding samples of said second data signals; and (e) filtering said selected log by dept-shifting samples thereof on the basis of displacement selected as the more accurate one in the preceding step, and producing a tangible representation of the resulting filtered well log.

14. The method of claim 13 wherein the step of determining a displacement includes the steps of combining samples of said first data signals within a first sample interval with samples of said second data signals within a second sample interval which is assumed to be derived with a predetermined displacement with the firm sample interval to produce a function of correlation between the samples within the first and second sample intervals and determining the displacement corresponding to the best correlation between the samples within said sample interval.

15. The method of claim 14 wherein the step of combining samples of first data signals within a first sample interval with samples of second data signals within a second sample interval includes the steps of progressively changing a predetermined displacement between said intervals and repetitively combining said samples to produce a plurality of correlation functions corresponding to said predetermined displacements between said intervals and comparing the plurality of correlation functions to select the displacement corresponding to a best fit between the samples within said intervals.

16. The method of claim 15 wherein the step of comparing the plurality of correlation functions to select the displacement corresponding to the best fit includes the step of comparing the correlation function corresponding to the best fit with a predetermined limit for such functions and disregarding said best fit function if within said limit.

17. The method of claim 16 wherein the step of comparing the plurality of displacements determined for the number of samples includes the steps of counting displacement occurrences having corresponding displacements and selecting as a more accurate displacement representation that displacement having a given count.

18. The method of claim 17 wherein the step of counting displacement occurrences having corresponding displacements includes the step of counting successive occurrence having corresponding displacements.

19. The method of claim 18 wherein the step of counting successive occurrences further includes the step of counting successive occurrences having identical displacements and selecting as a more accurate displacement representation that displacement having a count greater than a predetermined count.

20. The method of claim 17 wherein the step of counting occurrences further includes the step of counting occurrences having identical displacements and selecting as a more accurate displacement representation that displacement having a count greater than a predetermined count.

21. The method of claim 20 wherein each sample of aid logs derived at separate uniformly-spaced depth levels so that the determined displacement between a selected sample of the first data signals and a corresponding sample of the second data signal corresponds to a depth displacement between said logs.

22. A method of filtering a selected one of a plurality of well logs derived from separate investigating devices passed through a borehole and of producing a tangible representation of the resulting filtered log, comprising the following steps each of which is carried out by a machine:

(a) producing samples of first and second data signals corresponding to said logs and referenced to initial depth levels, where the samples of the first data signals comprise said selected well log;

(b) combining samples of first data signals within a first interval with corresponding samples of second data signals within a second interval which is assumed to be derived with a predetermined displacement between said intervals to produce a function of the fit between said combined samples within the first and second intervals;

(c) progressively changing the predetermined displacement between said intervals and repetitively combining said samples to produce a plurality of said functions for each of said predetermined displacements between said intervals;

(d) comparing said plurality of functions with each other to determine that function corresponding to a best fit between said combined samples within said intervals;

(e) comparing said determined best fit function with a given limit for such functions and disregarding said best fit function if within said limit;

(f) determining for said intervals a displacement corresponding to said best fit function if said best fit function is outside of said limit;

(g) repetitively performing all of said aforementioned steps to determine a plurality of displacements between a number of selected samples of said first data signals and corresponding samples of said second data signals within successive intervals of first and second data;

(h) counting displacement occurrences having corresponding displacements for a plurality of intervals of said first data signals;

(i) selecting as a more accurate displacement that displacement occurring at least a given number of times; and (j) filtering the selected well log by depth-shifting samples thereof on the basis of the displacement selected in the immediately preceding step, and producing a tangible representation of the resulting filtered well log.

23. The method of claim 22 in which the depth-shifting comprises shifting samples of the selected well log relative to samples of another well log by a displacement selected as a more accurate displacement to place samples of the last recited logs in more accurate alignment with each other.

* * * * *